United States Patent
Hill et al.

(10) Patent No.: US 9,227,608 B2
(45) Date of Patent: Jan. 5, 2016

(54) DECENTRALIZED ELECTRIC BRAKE SYSTEM

(75) Inventors: James L. Hill, Massillon, OH (US); Kurt Burkhalter, Akron, OH (US)

(73) Assignee: Meggitt Aircraft Braking Systems, Akron, OH (US)

( * ) Notice: Subject to any disclaimer, the term of this patent is extended or adjusted under 35 U.S.C. 154(b) by 585 days.

(21) Appl. No.: 12/539,884

(22) Filed: Aug. 12, 2009

(65) Prior Publication Data

US 2011/0040466 A1 Feb. 17, 2011

(51) Int. Cl.
| | |
|---|---|
| B60B 39/00 | (2006.01) |
| B60T 7/12 | (2006.01) |
| G05D 1/00 | (2006.01) |
| G06F 7/00 | (2006.01) |
| G06F 17/00 | (2006.01) |
| B60T 8/88 | (2006.01) |
| B60T 8/17 | (2006.01) |
| B60T 8/32 | (2006.01) |

(52) U.S. Cl.
CPC ............ *B60T 8/885* (2013.01); *B60T 8/1703* (2013.01); *B60T 8/325* (2013.01); *B60T 2270/402* (2013.01); *B60T 2270/413* (2013.01)

(58) Field of Classification Search
USPC ........................................................ 701/71
See application file for complete search history.

(56) References Cited

U.S. PATENT DOCUMENTS

| | | | |
|---|---|---|---|
| 4,986,610 A | 1/1991 | Beck | |
| 4,995,483 A | 2/1991 | Moseley | |
| 5,136,510 A | 8/1992 | Beck | |
| 5,139,461 A | 8/1992 | Kuti | |
| 5,146,408 A | 9/1992 | Valentic | |
| 6,241,325 B1 | 6/2001 | Gowan | |
| 6,291,372 B1 | 9/2001 | Mumick | |
| 6,296,325 B1 * | 10/2001 | Corio et al. | 303/20 |
| 6,402,259 B2 * | 6/2002 | Corio et al. | 303/20 |
| 7,039,517 B2 | 5/2006 | Rudd, III | |
| 7,110,873 B2 | 9/2006 | Rudd, III | |
| 7,489,996 B2 | 2/2009 | Gowan | |

(Continued)

FOREIGN PATENT DOCUMENTS

WO 2008144378 A1 11/2008

*Primary Examiner* — Imran Mustafa
(74) *Attorney, Agent, or Firm* — Renner, Kenner, Greive, Bobak, Taylor & Weber Co., LPA

(57) ABSTRACT

An electric aircraft brake control system has a plurality of wheel and brake assemblies, each having a wheel, wheel speed transducer, brake assembly and a brake actuator. Electromechanical control units are uniquely associated with and connected to certain of the wheel and brake assemblies, and each of the electromechanical control units is provided with an antiskid system as an integral portion thereof. Brake data concentrators are provided for receiving data corresponding to various aircraft operational parameters, including brake pedal position, and provide operational signals to the electromechanical control unit as a function thereof. A controller for emergency and park braking is connected to the electromechanical actuator controllers through one of the brake data concentrators to effect emergency braking action on the brake assemblies, such emergency braking action having incident antiskid control. The system allows for a redundancy in brake control circuitry and operation, which increases the dispatchability of an associated aircraft by ensuring continued effective operation of the aircraft even in view of a failure of one of the redundant circuits or systems. A reduction in weight is also achieve by reducing lengthy cable runs.

16 Claims, 7 Drawing Sheets

(56) References Cited

U.S. PATENT DOCUMENTS

| | | | |
|---|---|---|---|
| 2008/0154443 A1* | 6/2008 | Godo | B60T 13/74 701/3 |
| 2010/0070150 A1* | 3/2010 | May | B60T 8/1703 701/71 |
| 2010/0274458 A1* | 10/2010 | Cahill | B60T 8/1703 701/76 |
| 2010/0292889 A1* | 11/2010 | Cahill et al. | 701/31 |

* cited by examiner

DECENTRALIZED ELECTRIC BRAKE SYSTEM

TECHNICAL FIELD

The invention herein resides in the art of vehicle braking systems and, more particularly, to an aircraft braking system. Specifically, the invention relates to electric brake systems for use on aircraft, in which the antiskid portion of the braking system is located in and associated with discrete electromechanical actuator controllers uniquely associated with the brakes of the aircraft. The invention specifically relates to the utilization of electromechanical actuator controllers that ensure antiskid functionality in both normal and alternate or emergency braking operation modes.

BACKGROUND OF THE INVENTION

The use of electric brakes in aircraft systems is becoming increasingly popular. In such systems, electric motors are employed to drive a piston through gears, screws and the like, into a pressure plate of a brake disc stack. Typically, a plurality of actuators are associated with each brake assembly, generally being uniformly distributed thereabout. Prior art electric braking systems have been developed to incorporate antiskid technology within a centralized braking control unit that is located at, or uniquely associated with, the cockpit of the aircraft. However, these systems can have limited antiskid capabilities. The antiskid controller resides hierarchically above and separate from the brake actuators. In this configuration, the antiskid capabilities are generally limited to normal braking mode only, and not applicable to an alternate or emergency braking mode associated with the braking system. Accordingly, dispatchability of the aircraft is necessarily limited. With the antiskid system of the prior art being centralized to the braking system, a single failure can result in a grounding of the aircraft until that failure is fixed. There is a need in the art for a decentralization of the antiskid function which, when combined with dual output wheel speed transducers, will allow a braking system to retain antiskid on all wheels in the event of a single failure, while tolerating further failures and leading to improved functionality, safety, and dispatchability.

A decentralized and distributed antiskid control system has further advantages in being located in closer proximity to the brake actuators. In this fashion, weight reductions may be achieved by reductions in cable weight realized by shorter wheel speed transducer cable runs as compared to centrally located control in the cockpit or an avionics bay. Furthermore, signals to command and control specific actuators are available in the same enclosure with the antiskid controller.

DISCLOSURE OF THE INVENTION

In light of the foregoing, it is a first aspect of the invention to provide a decentralized electric brake system that provides antiskid functionality at the brake actuator controller.

Another aspect of the invention is the provision of a decentralized electric brake system in which antiskid functionality is attainable in both normal and alternate or emergency braking modes of operation.

Still a further aspect of the invention is the provision of a decentralized electric brake system which includes antiskid control associated with each of the electromechanical actuator controllers of the brake system, in combination with dual output wheel speed transducers, allowing the braking system to retain antiskid functionality on all wheels in the event of a single failure of an actuator.

Yet another aspect of the invention is the provision of a decentralized electric brake system which attains a weight reduction over prior systems by placing antiskid system functionality at the electromechanical actuators of the brakes, significantly reducing wheel speed transducer and other cable runs compared to the prior art.

A further aspect of the invention is the provision of a decentralized electric brake system which is reliable in operation, cost effective in implementation, and readily devised with state of the art components.

The foregoing and other aspects of the invention that will become apparent as the detailed description proceeds are achieved by an electric aircraft brake control system, comprising: a plurality of wheel and brake assemblies, each assembly having a wheel, wheel speed transducer, brake assembly, and a brake actuator; pairs of electromechanical control units uniquely associated with and connected to certain of said wheel and brake assemblies, said electromechanical control units having antiskid systems as a part thereof; and at least two brake data concentrators receiving data corresponding to various aircraft operational parameters, including brake pedal position, and providing operational signals to said electromechanical control units as a function thereof.

Other aspects of the invention that will become apparent herein are attained by an electric aircraft brake control system, comprising: a plurality of wheel and brake assemblies, each assembly having a wheel, wheel speed transducer, brake assembly, and a brake actuator; electromechanical control units uniquely associated with and connected to certain of said wheel and brake assemblies, said electromechanical control units having antiskid systems as a part thereof; first and second brake data concentrators receiving data corresponding to various aircraft operational parameters, including brake pedal position, and providing operational signals to said electromechanical control units as a function thereof; and a controller for emergency and park braking connected to said electromechanical actuator controllers through one of said brake data concentrators to effect emergency braking action on said brake assemblies, with antiskid control.

DESCRIPTION OF DRAWINGS

For a complete understanding of the various aspects and features of the invention, reference should be made to the following detailed description and accompanying drawings wherein:

FIG. 1, comprising

FIG. 2, comprising

BEST MODE FOR CARRYING OUT THE INVENTION

Figure 1A:
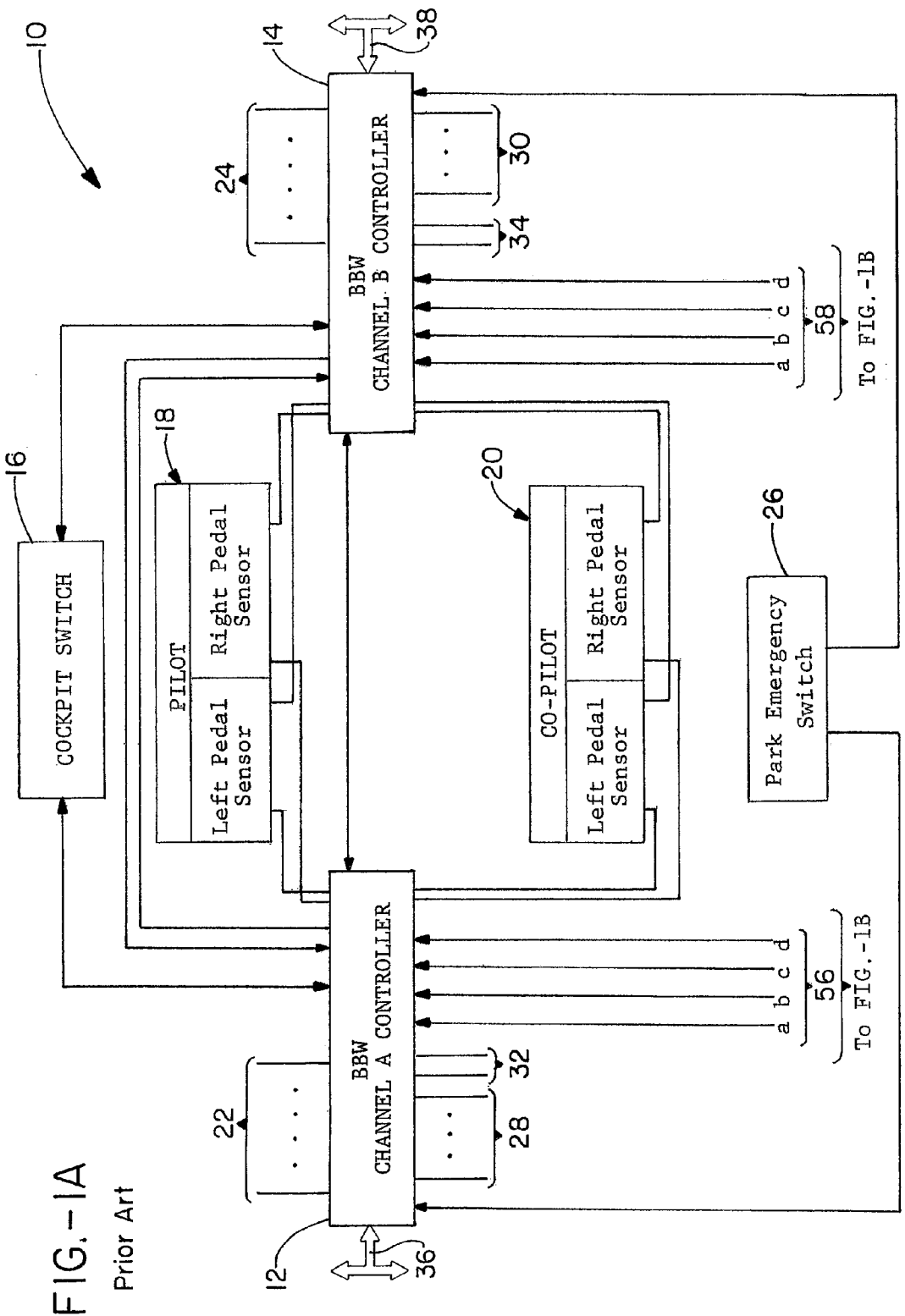
FIGS. 1A, 1B and 1C, is a block diagram illustration of a prior art brake control system.
Figure 1B:
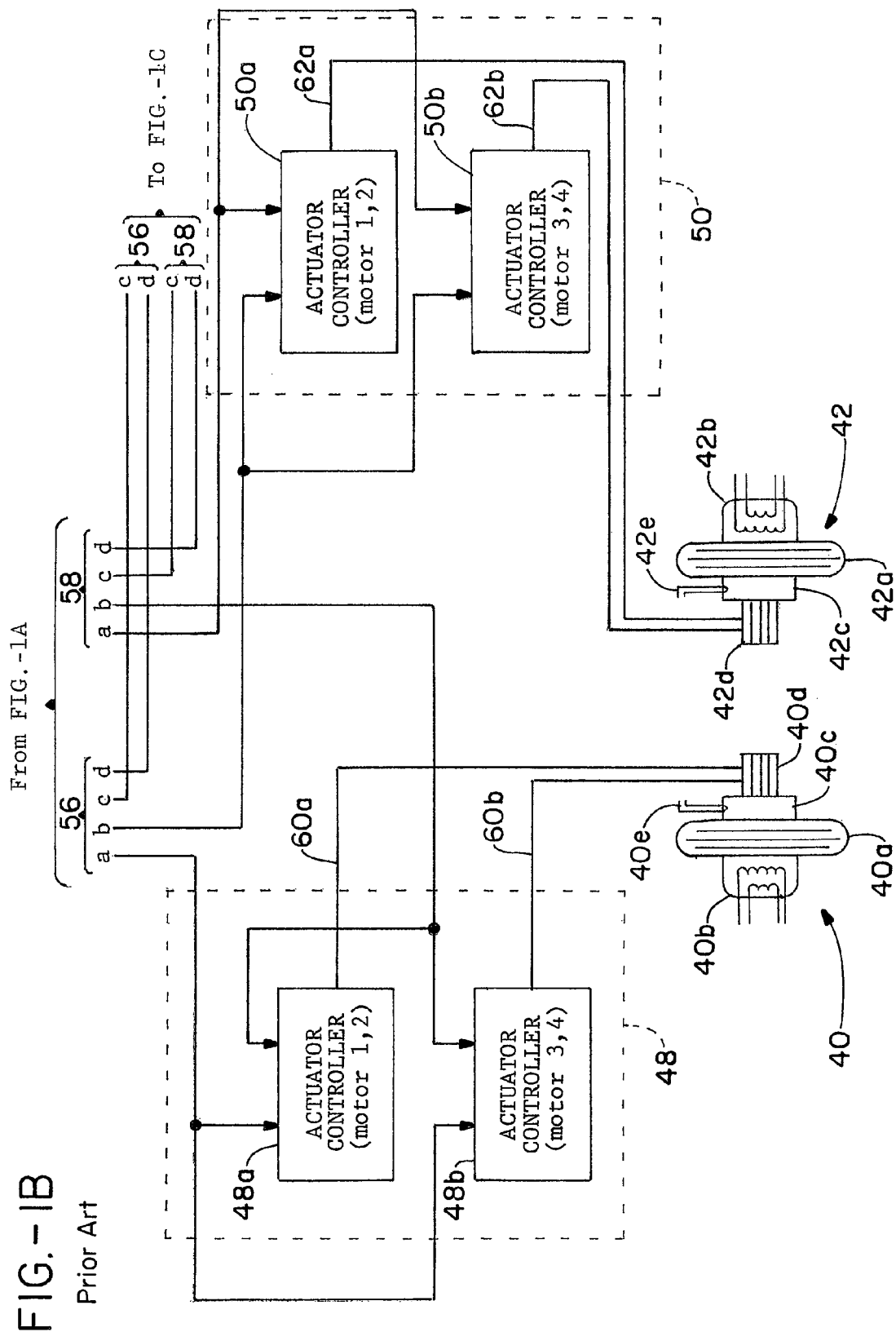
Figure 1C:
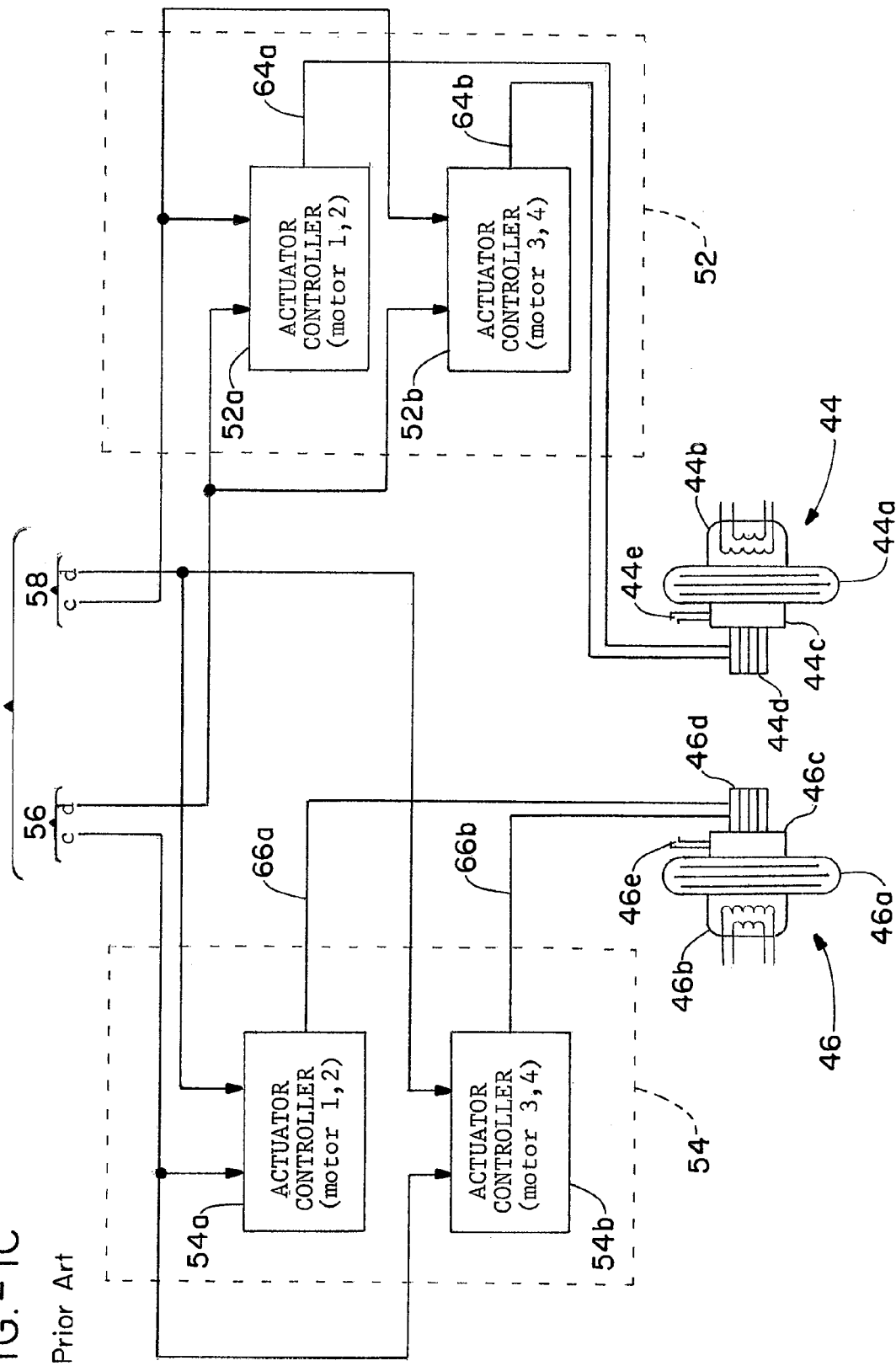

Referring now to the drawings and more particularly FIG. 1, it can be seen that a brake control system made in accordance with the prior art is designated generally by the numeral 10. The system 10 is presented and described herein with regard to a particularly illustrated brake system architecture, although those skilled in the art will readily appreciate its adaptability to a broad range of architectures. The brake control system 10 is shown illustratively as a brake-by-wire system, in which the braking activity and control signals relevant thereto are all electrical, rather than hydraulic. The brake control system 10 includes a pair of controllers 12, 14 to provide for a degree of failsafe redundancy. As will be appreciated by those skilled in the art, and be apparent later herein, the controllers 12, 14 process and provide for generation of all of the requisite brake control signals for operating the system 10. The controllers 12, 14 provide for the generation of brake application and release signals, automatic braking signals, antiskid brake control signals, brake temperature and/or tire pressure monitoring and associated control activities, and the like. The controllers 12, 14 are typically maintained in an avionics bay, within the cockpit of the aircraft, or where space may accommodate.

A cockpit switch 16 is provided for accessibility by the pilot for selecting various operational parameters such as auto-brake, rejected takeoff, and the like. In that regard, the cockpit switch 16 communicates with both controllers 12, 14, which process the signals received from the switch 16. Left and right pilot brake pedals 18 and similar left and right co-pilot brake pedals 20 are provided in the cockpit for the pilot and co-pilot to generate brake demand signals. As is well understood by those skilled in the art, the brake pedals 18, 20 are typically connected to a linear variable differential transformer or the like, such that brake pedal position, correlating with particular braking demand, generates an electrical output signal of corresponding amplitude which is passed to the controllers 12,14 for the generation of a brake control signal.

Each of the controllers 12, 14 receives a number of control inputs, as will be readily appreciated and understood by those skilled in the art. These inputs, designated 22 and 24, generally include a voltage supply, a signal corresponding to throttle position, a weight on wheels (WOW) signal, a gear handle position signal, and inputs from a parking brake/emergency switch 26, shown illustratively in the drawing. As those skilled in the art will appreciate, each of these signals is used for determining the sequence, activity, or amplitude of requisite braking operation. Also provided as inputs to each of the controllers 12, 14 are the inputs 28, 30 from wheel speed transducers associated with the wheels of the aircraft. Those skilled in the art will appreciate that the wheel speed transducer signals 28, 30 provide an indication of the instantaneous speeds of the various wheels of the aircraft which can be used to determine the speed of the aircraft itself, rates of deceleration, skidding activity, incipient skids, and the like. Such signals are, as well know by those skilled in the art, important for operation in an auto-brake mode, and particularly for operation of the antiskid portion of the controllers 12,14.

Also provided to the controllers 12, 14 are brake temperature and/or tire pressure monitoring signals 32, 34. For many braking operations, the temperature of the brake and/or tire pressure is of particular importance and monitoring of the same is controlled by the controllers 12, 14. Finally, each of the controllers 12, 14 communicates with a databus 36, 38 to other avionics within the system.

The brake control system 10 is shown as used in association with an aircraft having four braked wheels comprising wheel and brake assemblies 40-46. These include a left outboard wheel and brake assembly 40, a left inboard wheel and brake assembly 42, a right outboard wheel and brake assembly 44, and a left inboard wheel and brake assembly 46. Each of the wheel and brake assemblies 40-46 includes a wheel 40a-46a, having associated therewith a wheel speed transducer 40b-46b and a brake assembly 40c-46c. As those skilled in the art will readily appreciate, in the context of an electric brake, the brake assemblies 40c-46c include a brake disc stack, a pressure plate, a backplate, and the like structure. An actuator 40d-46d is associated with each of the wheel and brake assemblies 40-46 and, in known fashion, typically includes a motor, a screw drive mechanism, gear assemblies, and the like. The actuators 40d-46d urge the pressure plate toward and away from the backplate, effecting the application and release of brake force imparted by the engagement and disengagement of the interleaved stator and rotor discs of the brake disc stack. Finally, each of the wheel and brake assemblies 40-46 also typically includes brake temperature and/or tire pressure monitoring sensors 40e-46e associated with the brake disc stacks for purposes well known to those skilled in the art.

Interposed between the controllers 12, 14 and wheel and brake assemblies 40-46 are controller assemblies 48-54, each including a pair of controllers (designated "a" and "b.") Controller 40a controls two of the motors associated with the actuator 40d, while the controller 40b controls the other two motors associated with the actuator 40d. Similarly, controllers 50a and 50b each control two of the motors associated with the actuator 42d, while controllers 52a and 52b control respective pairs of motors of the actuator 44d, and the controllers 54a, 54b control respective pairs of motors associated with the actuator 46d. Those skilled in the art will appreciate that the controllers 48-54 comprise motor drive circuits for reversibly driving associated motors to cause the application and release of brake force by the resultant extension and retractions of pistons in association with a pressure plate.

As shown in FIG. 1, a set of control lines, bus or network 56 is provided from the controller 12 to each of the controllers 48a,b-54a,b. In like manner, a set of control lines, bus or network 58 interconnect the controller 14 with each of the controllers 48a,b-54a,b.

As shown, the system 10 provides for a high degree of redundancy, with each of the controllers 12, 14 being capable of operating and controlling each of the control assemblies 48-54, and specifically each of the controllers 48a,b-54a, b. While in normal operation, each of the controllers 12, 14 controls only half of the brakes, in the event of a failure in a controller 12, 14, the remaining controller is capable of controlling all of the brake assemblies. However, in the event of a failure of either controller 12, 14, there is no remaining redundancy for the surviving controller. Accordingly, the dispatchability of the associated aircraft is defeated, and the aircraft must be taken out of service until the failed controller 12, 14 is repaired or replaced. This problem is inherent in the fact that all of the data processing and control of the brake assembly 10 is achieved through the controllers 12, 14, with the controller assemblies 48-54 being responsive circuits, receiving control signals from the controllers 12, 14 and generating therefrom appropriate control signals for the actuator 40d-46d.

Figure 2A:
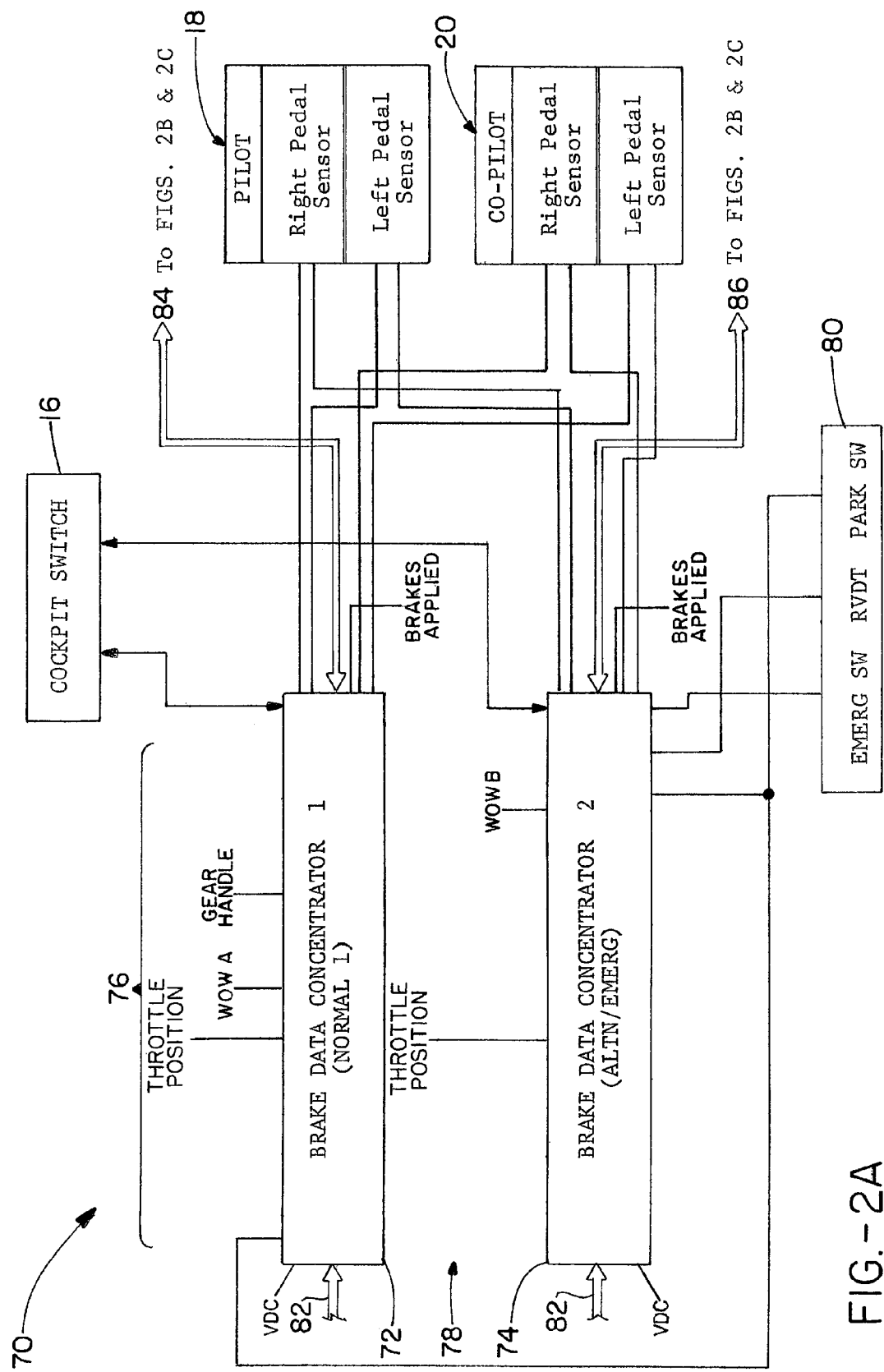
FIGS. 2A, 2B and 2C, is a block diagram illustration of the brake control system of the invention.
Figure 2B:
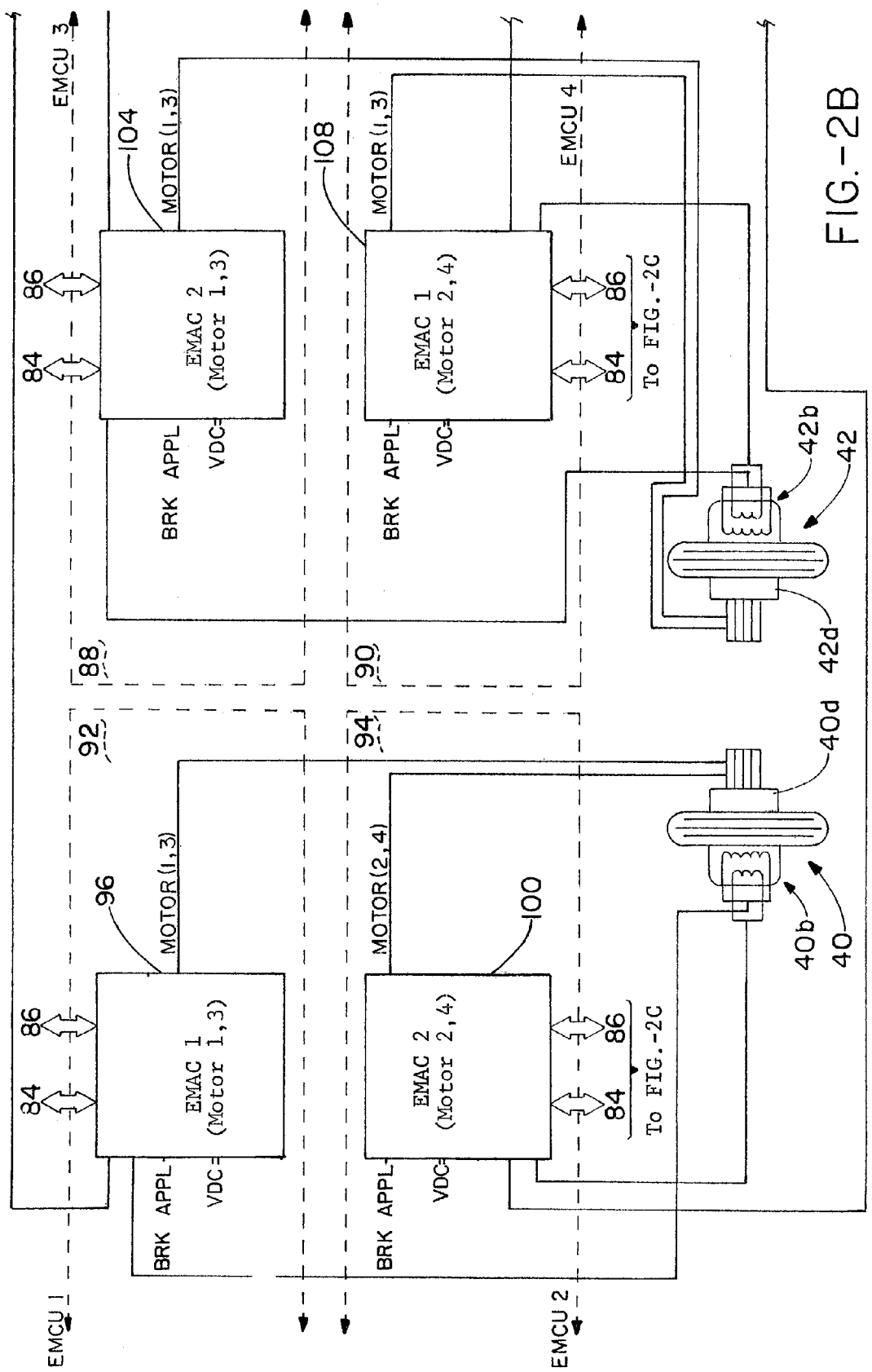
Figure 2C:
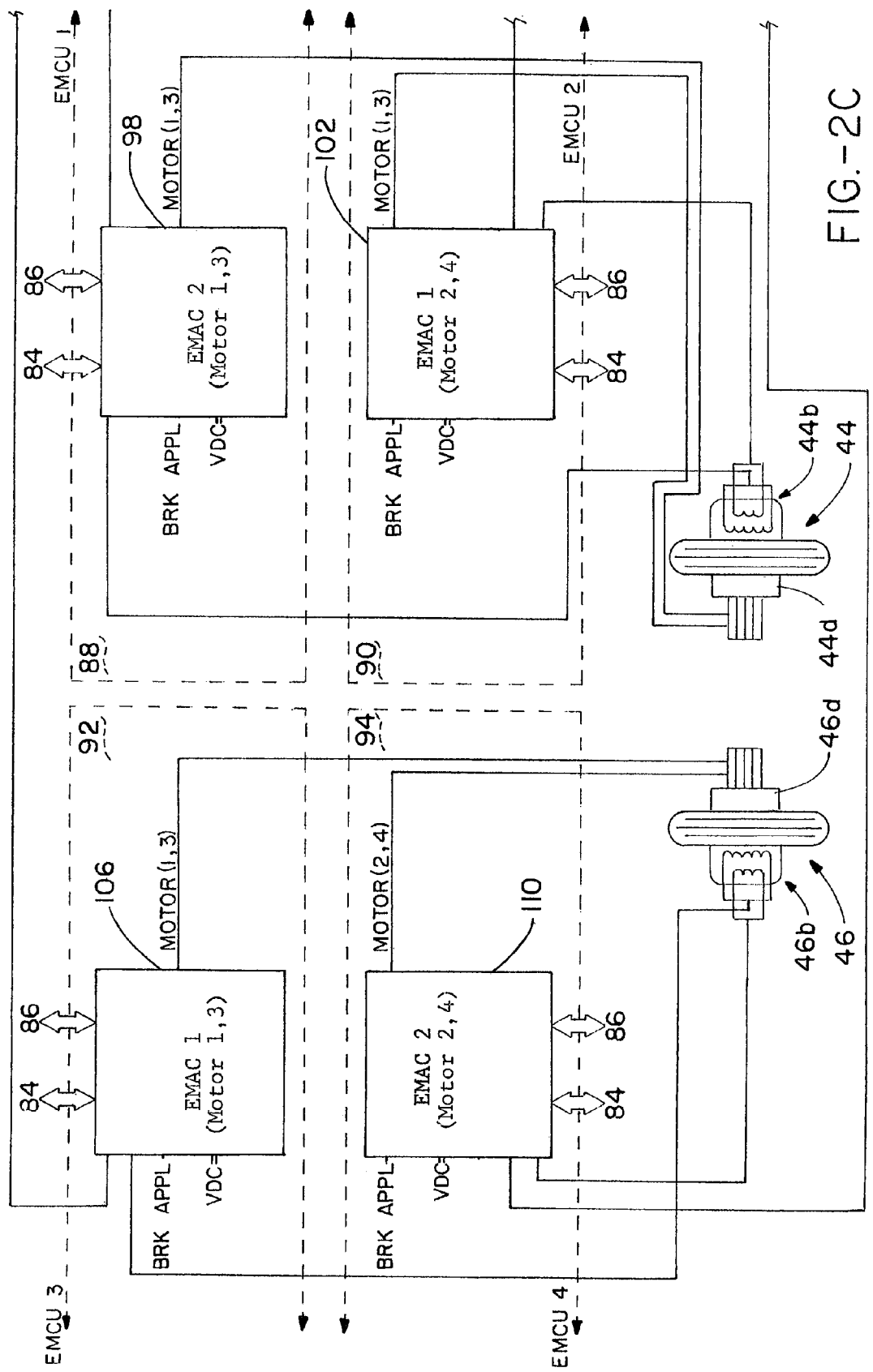

With reference now to FIG. 2, an appreciation can be obtained as to the structure and operation of the decentralized electric brake system of the invention, designated generally by the numeral 70. In the system 70, elements that are common to the system 10 of FIG. 1 are designated by the same numerals and functional recitations. The brake system 70 includes a duplicate pair of circuits, referred to herein as brake data concentrators 72, 74, which serve to perform the basic brake system functions of pedal signal processing, data bus/network communications, auto-brake command interpretation, park command interpretation, brake temperature and/or tire pressure monitoring system operation, and the like. As will become apparent later herein, the auto brake command interpretation and the brake temperature monitoring system operation may actually be performed in direct association with the wheel and brake assemblies of the aircraft.

Associated with each of the brake data concentrators 72, 74 are inputs such as the auto-brake cockpit switch 16, along with pilot and co-pilot right and left peddle assembles and sensors 18, 20. Each of these units 16-20 provides an input to each of the redundant brake data concentrators 72, 74. As with the system 10, additional standard inputs 76, 78 are provided to the respective brake data concentrators 72, 74, including signals corresponding to throttle, weight on wheels (WOW) signals, out of Figs. also, gear handle position, and the like.

Uniquely associated with the system 70 is an emergency/park switch controller 80, providing three particular inputs to the brake data concentrator 74. The controller 80 may serve to simply provide a park switch signal to the brake data concentrator 74 when the aircraft is, for example, parked at the terminal. Alternately, in the event of other brake failure, the controller 80 may provide an emergency brake signal to the brake data concentrator 74, which signal may serve to trigger an automated braking of the aircraft, with or without pilot control. Finally, as a third input from the controller 80 to the brake data concentrator 74, a rotary variable differential transformer may be employed to provide a varying signal, under pilot control, to the brake data concentrator 74 in the event of other brake failure and the desire of the pilot to assume rudimentary control of the aircraft braking.

Communicating with each of the brake data concentrators 72, 74 is, for example, a 429 databus 82, in communication with the avionics systems and other necessary elements of the aircraft. Similarly communicating with the brake data concentrators 72, 74 are first and second buses 84, 86, as will become apparent directly below.

With continued reference to FIG. 2, it can be seen that the exemplary aircraft of the invention again includes outboard wheel and brake assemblies 40, 44 and inboard wheel and brake assemblies 42, 46, each having associated therewith the same basic structures in the system 10, comprising a wheel, wheel speed transducer, brake assembly comprising a heat stack, pressure plate and backplate, an actuator consisting of a motor, screw and gear assemblies and the like, and a brake temperature monitoring system, as desired.

Control of the aircraft braking is primarily achieved by means of electromechanical control units 88, 90, 92, 94, as shown. The electromechanical control units 88, 90 are associated with the outboard wheel and brake assemblies 40, 44, while the electromechanical control units 92, 94 are associated with the inboard wheel and brake assemblies 42, 46. The paired electromechanical control units provide a high degree of redundancy in the control circuit structure and operation.

Each of the electromechanical control units 88-94 includes a pair of electromechanical actuator controllers 96-110. The controllers 96, 98 are associated with the electromechanical control unit 88, the pair 100-102 is associated with the electromechanical control unit 90, the pair 104, 106 is associated with the pair of 92, and the pair 108, 110 is associated with the electromechanical control unit 94.

The antiskid operation associated with the brake system 70 is achieved through the redundantly provided pairs of electromechanical actuator controllers associated with each of the various wheel and brake assemblies 40-46. As shown, the outputs of the wheel speed transducers 40b-46b are provided to each of a pair of associated electromechanical actuator controllers, one associated with each of two different electromechanical control units. The electromechanical actuator controllers communicate with each other, sharing wheel speed data, such that aircraft ground speed can be determined, as can the presence of skids, incipient skids, deceleration rates, and the like. With the redundancy provided, failure of any particular electromechanical control unit 88-94, or an electromechanical actuator controller 96-110 will not be fatal to operation of the system, but such operation may continue substantially unimpeded. Moreover, even failure of a pair of electromechanical control units, or multiple electromechanical actuator controllers will not necessarily preclude operation of the brake system 70. For example, using multiple actuators allows them to be designed to compensate for individual actuators that become inoperative. Indeed, that operation can continue with antiskid operation which, in the prior art, would be substantially lost, or so impaired that dispatchability of the aircraft would be precluded.

The system 70 provides a normal braking channel via brake data concentrator 72, and an alternate braking channel via brake data concentrator 74 (in the event the concentrator 72 fails), along with emergency braking mode via the controller 80, all of which operate with antiskid performance. It will be appreciated that the emergency braking mode would only be enabled when both brake data concentrators 72, 74 are indicated of an unacceptable status. The controller 80 preferably comprises a multi-position handle commanding levels of progressively increasing declaration. Since the antiskid function is included in the electromechanical control units 88-94, the emergency braking is provided with antiskid protection, a feature not provided with conventional brake by wire systems, which typically feature manually actuated emergency braking system without antiskid protection.

As mentioned above, each of the electromechanical control units 88-94 shares wheel speed signals in order to facilitate locked-wheel protection, and to provide means for determining aircraft speed. It will be appreciated by those skilled in the art that a cross-channel data link could be configured between actuator controllers sharing the same wheel to provide further antiskid protection in the event of failure of a single wheel speed transducer channel.

It will further become apparent to those skilled in the art that the electromechanical control unit may be used to perform other braking functions in direct association with the wheel and brake assemblies themselves. Auto-braking and brake temperature monitoring functions are among those that are conducive to such a system.

Also included as a portion of the invention is the provision of power conversion in each EMAC. In order to achieved desired dispatchability, redundancy and safety, the instant invention provides for local power conversion to drive the actuator motors. Each EMAC is configured to include power supply circuitry to convert the aircraft voltage supply to a motor driving voltage. Typically, the aircraft is provided with a 28 volte DC supply, while the actuator motors are configured to operate, most preferably, at 120 VAC. By allowing each EMAC its own power conversion, not only is the safety and redundancy mentioned above achieved, but the brake system of the invention is readily adapted to being retrofit to existing aircraft. Since each aircraft typically has a 28 volt DC supply, backed up by a redundant 28 volt supply, and each EMAC is provided with redundancy at the input and in the power conversion, multiplicities of redundancy and safety are attained. Inherently, the instant invention provides improved redundancy due to the localized version, wherein the distributed architecture provides for power conversion essentially at each wheel.

The instant invention contemplates the use of two power supplies in each EMAC, the power supplier being connected in series in order to obtain both the necessary voltage and current for desired operation. Moreover, even if one of the power supplies is lost or fails, operation can still be attained, since the motor actuators can operate on 60 volts even if designed to operate at 120 volts. This conversion provides for better operation than prior art which operated motors at 270 volts, showing significant decrease in operational integrity when supplied with only 135 volts.

Figure 3:
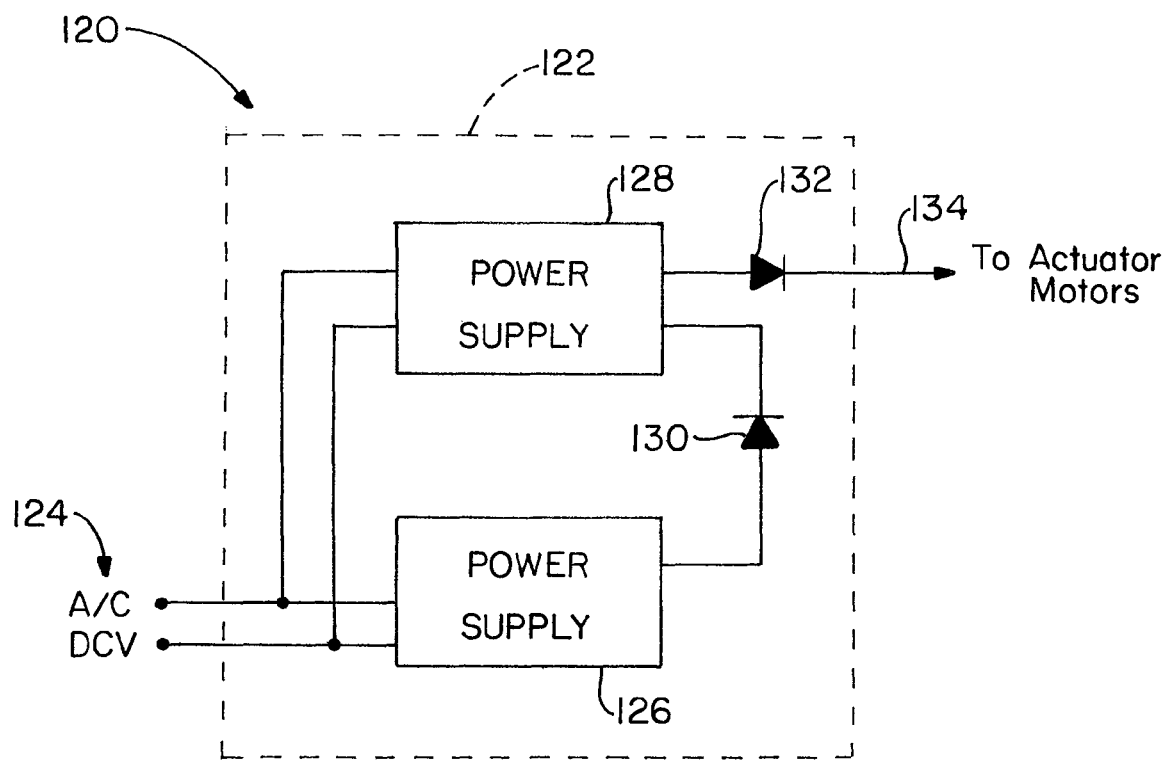
FIG. 3 is a block diagram of the localized power generation circuitry of the invention.

As shown in FIG. 3, the power generation circuitry employed in accordance with the instant invention is designated generally by the numeral 120, as maintained within a typical EMAC 122. As shown, the power generation circuit 120 is provided with redundant aircraft DC voltage input at 124, the same typically being 28 VDC. This aircraft voltage is redundantly applied to each of the power supplies 126, 128, the same each being a 60 VAC power supply. The power supply 126 is connected through an isolation diode 130 to the power supply 128. In turn, the output of the power supply 128 passes through an isolation diode 132 to an output 134 connected to pairs of actuator motors.

According to a preferred embodiment of the invention, the aircraft voltage provided at 124 is a 28 VDC source, and each of the power supplies 126, 128 is adapted to provide a 60 volt DC output. Accordingly, with the interconnection through the isolation diodes 130, 132, this series connection provides for 120 volts or DC (VDC) when both power supplies 126, 128 are operative, with sufficient current drive for the connected actuator motors or, alternatively, for at least 60 VDC in the event that one of the power supplies 126, 128 fails.

It will further be appreciated that the system 70 achieves certain economy by reducing cable lengths and minimizing communication paths, doing so in a cost effective manner. While the system contemplates an increase in electronic hardware, to achieve the requisite redundancy, electronics are relatively inexpensive, particularly in light of the benefits to be achieved from the system just described.

Thus it can be seen that the aspects of the invention have been attained by the structure presented above. While in accordance with the patent statutes only the best mode and preferred embodiment of the invention has been presented and described in detail, the invention is not limited thereto or thereby. For example, the distributed electromechanical and antiskid controllers could be configured to drive individual actuators on different and paired brakes of the same strut, in accordance with aircraft using "paired wheel" antiskid control philosophy, or otherwise configured to accommodate various brake system architectures. Accordingly, for an appreciation of the true scope and breadth of the invention reference should be made to the following claims.

What is claimed is:

1. An electric aircraft brake control system, comprising:
   a plurality of wheel and brake assemblies, each assembly having a wheel, wheel speed transducer, brake assembly, and a brake actuator;
   pairs of electromechanical control units uniquely associated with and connected to certain actuator controllers of said wheel and brake assemblies, said actuator controllers having antiskid systems as a part thereof connected to specific actuators of associated wheel and brake assemblies;
   said actuator controllers configured independently of each other, such that a failure of any one or more controllers allows the remaining controllers to continue to operate unimpeded with antiskid capability such that the aircraft brake control system experiences only the partial loss of functionality associated with the failed controller or controllers to thereby ensure aircraft dispatchability; and
   at least two brake data concentrators receiving data corresponding to various aircraft operational parameters, including brake pedal position, and providing operational signals to said electromechanical control units as a function thereof.

2. The electric aircraft brake control system according to claim 1, wherein said wheel speed transducer provide signals to said associated electromechanical control units corresponding to instantaneous wheel speed.

3. The electric aircraft brake control system according to claim 2, wherein each said electromechanical control unit comprises an electromechanical actuator controller connected and providing drive to an associated brake actuator.

4. The electric aircraft brake control system according to claim 3, wherein various of said electromechanical actuator controllers are connected to, and share wheel speed data with, each other.

5. The electric aircraft brake control system according to claim 3, further comprising a controller for emergency and park braking.

6. The electric aircraft brake control system according to claim 5, wherein said controller for emergency and park braking is connected to said electromechanical actuator controller through one of said brake data concentrators to effect emergency braking action on said brake assemblies, with antiskid control.

7. The electric aircraft brake control system according to claim 6, wherein said controller for emergency and park braking comprises a differential transformer for providing a pilot-controlled output signal.

8. The electric aircraft brake control system according to claim 5, wherein said electromechanical control units further comprise automatic braking control systems for associated wheel and brake assemblies.

9. The electric aircraft brake control system according to claim 8, wherein said electromechanical control units further comprise brake temperature monitoring systems, taken from the group of brake temperature and tire pressure, for associated wheel and brake assemblies.

10. The electric aircraft brake control system according to claim 5, wherein said electromechanical control units are in closer proximity to said associated wheel and brake assemblies than said brake data concentrators are to said wheel and brake assemblies.

11. An electric aircraft brake control system, comprising:
    a plurality of wheel and brake assemblies, each assembly having a wheel, wheel speed transducer, brake assembly, and a brake actuator;
    electromechanical control units uniquely associated with and connected to certain actuator controllers of said wheel and brake assemblies, said actuator controllers having antiskid systems as a part thereof connected to specific actuators of associated wheel and brake assemblies such that the failure of any control unit results in only the partial loss of functionality for the brake control system associated with the failed control unit;
    first and second brake data concentrators receiving data corresponding to various aircraft operational parameters, including brake pedal position, and providing operational signals to said electromechanical control units as a function thereof; and
    a controller for emergency and park braking connected to said electromechanical actuator controllers through one of said brake data concentrators to effect emergency braking action on said brake assemblies, with antiskid control.

12. The electric aircraft brake control system according to claim 11, wherein said controller for emergency and park braking comprises a variable transformer for effecting a pilot-controller output signal.

13. The electric aircraft brake control system according to claim 11, wherein said first brake data concentrator provides operations signals to said electromechanical control units during normal operation, and said second brake concentrator provides operational signals to said electromechanical control units upon failure of said first brake data concentrator and upon need of operator of said controller for emergency and park braking.

14. The electric aircraft brake control system according to claim 11, wherein said electromechanical control units contain redundant circuits and provide redundant connections with said wheel and brake assemblies.

15. The electric aircraft brake control system according to claim 11, wherein each said electromechanical control unit comprises a power generation circuit interconnected between an aircraft power supply source and an associated pair of motors of a brake actuator.

16. The electric aircraft brake control system according to claim 15, wherein each said power generation circuit comprises a pair of power supplies connected in series to the pair of motors.

* * * * *